United States Patent [19]

Ackerman

[11] Patent Number: 5,625,500
[45] Date of Patent: Apr. 29, 1997

[54] HITCHING MIRROR

[76] Inventor: Bruce Ackerman, 160 Wildwood, Algonquin, Ill. 60102

[21] Appl. No.: 364,736

[22] Filed: Dec. 27, 1994

[51] Int. Cl.⁶ .............. G02B 5/08; G02B 7/182; B60R 1/06
[52] U.S. Cl. .............. 359/841; 359/872; 33/264; 248/467; 248/479
[58] Field of Search .............. 359/841, 850, 359/855, 856, 857, 861, 862, 865, 872, 884; 248/467, 479, 480; 280/477; 33/264

[56] References Cited

U.S. PATENT DOCUMENTS

| | | | |
|---|---|---|---|
| 1,986,033 | 1/1935 | Trufant | 359/857 |
| 2,197,280 | 4/1940 | Topping | 359/861 |
| 3,332,731 | 7/1967 | Penk | 359/872 |
| 4,340,646 | 7/1982 | Ohno et al. | 359/884 |
| 4,905,376 | 3/1990 | Neeley | 280/477 |
| 4,925,287 | 5/1990 | Lord et al. | 248/467 |
| 4,951,913 | 8/1990 | Quesada | 359/872 |
| 5,111,342 | 5/1992 | Quesada | 248/480 |
| 5,153,781 | 10/1992 | Brandt | 359/865 |
| 5,180,182 | 1/1993 | Haworth | 359/872 |
| 5,313,337 | 5/1994 | Byers | 248/467 |

*Primary Examiner*—Ricky D. Shafer
*Attorney, Agent, or Firm*—Michael R. McKenna

[57] ABSTRACT

A hitching mirror for viewing a hitch at the rear of a towing vehicle includes a first panel having a lower reflective surface, a second panel with a suction cup for securing the hitching mirror to a rear window and an incremental adjuster for incrementally adjusting the position of the reflective surface relative to the hitch.

6 Claims, 2 Drawing Sheets

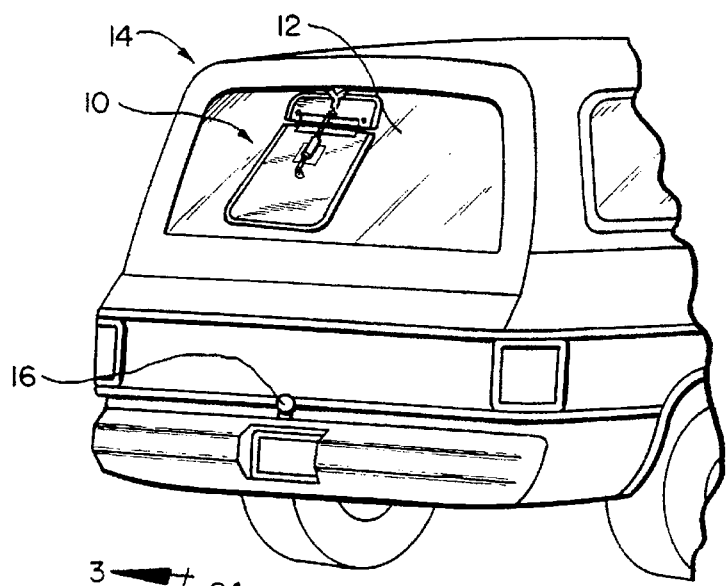
FIG.1
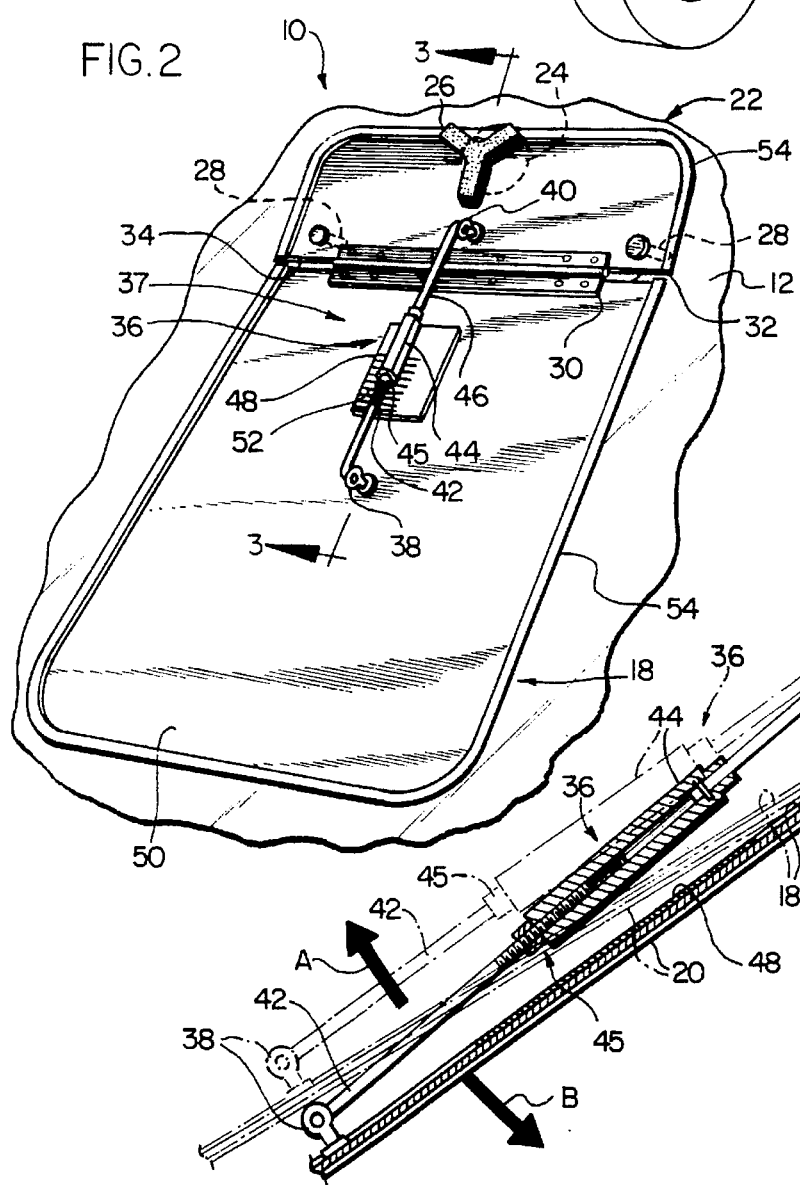
FIG.2
FIG.3

HITCHING MIRROR

TECHNICAL FIELD

This invention generally relates to mirrors to assist in the viewing of a hitch on the back of a towing vehicle. More particularly, the invention relates to a hitching mirror that has a reflective surface that is incrementally adjustable and that is secured to a rear window of the towing vehicle.

BACKGROUND OF THE INVENTION

There are many types of hitches that permit a towing vehicle to be connected to a towed vehicle. A representative hitch that uses a male ball on the towing vehicle and a female socket on the towed vehicle will be discussed herein.

Mating the ball and the socket is very time consuming because the driver cannot see the ball and socket when trying to properly position them. The rear view mirror of the towing vehicle by itself is useless as the driver cannot see the hitch with it. It is not unusual for the driver to get out of the towing vehicle, walk back to the rear of the towing vehicle to see if the ball and socket are properly positioned, walk back to the towing vehicle, move the towing vehicle and walk back to the rear of the towing vehicle to see if the ball and socket are properly positioned two, three or four times before they are properly positioned.

Even if a second person is available to give directions to the driver, hitching is still difficult because of problems with communication, the time lag resulting from the towing vehicle being in motion during positioning (which can result in the overshooting the socket) and the need for prior coordination between the driver and the second person relating to the directions whether they be communicated verbally or by hand signals.

Mirrors are known to assist the driver in positioning the ball and socket. Alignment of the mirror to view the hitch is accomplished by gross adjustments such as by loosening the mirror from a bracket and rotating the mirror by hand. Gross adjustment often results in the driver tilting the mirror too far in one direction and then the other until the mirror is properly aligned. There is no fine control over the alignment of the mirror. Gross adjustment is very time consuming and frustrates the driver. The mirror must be adjusted depending upon where the mirror is affixed and the height of the driver. Thus, when the driver changes or the mirror is repositioned, the time consuming process must be repeated.

Some mirrors are not affixed to the towing vehicle but rather are affixed to the towed vehicle. This arrangement forces a driver having more than one towed vehicle to either purchase a separate mirror for each towed vehicle or move the mirror from one towed vehicle to another and adjust the mirror each time it is moved. Neither of these options is desirable.

Other shortcomings of various mirror designs that interfere with viewing of the hitch include curved mirrors that distort the view, mirrors made of glass that can break and mirrors that are exposed to precipitation that can obstruct the view.

Many existing mirrors are not positioned over the hitch which makes proper positioning of the ball and socket more difficult because the view of the driver does not represent the true position of the ball and socket.

A hitching mirror that is incrementally adjustable to readily permit the driver to adjust the position of the mirror to enable viewing of the hitch and that attaches to a rear window of a towing vehicle is desirable.

SUMMARY OF THE INVENTION

A hitching mirror for viewing a hitch at the rear of a towing vehicle includes a first panel having a lower reflective surface, a second panel with a suction cup thereon for securing the first panel to a rear window of the towing vehicle and an incremental adjuster for incrementally adjusting the position of the reflective surface. The incremental adjuster permits fine control over the position of the hitching mirror which facilitates use of the hitching mirror and hitching of the towing and towed vehicles.

The hitching mirror is attached to the towing vehicle which results in a driver being able to use the same towing vehicle with numerous towed vehicles without the need to purchase a hitching mirror for each towed vehicle or move the hitching mirror from one towed vehicle to another and adjust the mirror each time it is moved.

The reflective surface of the hitching mirror is preferably flat which eliminates distortions caused by a curved surface. Polishing a surface of the first panel to make the reflective surface results in the reflective surface being unbreakable when the first panel is made of a plastic or other unbreakable material that can be made reflective. A preferred material is a mirrored acrylic for the first panel and sheet aluminum for the narrow panel.

The first panel is preferably an elongate first panel that extends over the hitch. This structure permits the reflective surface to be shielded from precipitation that can distort the view. This structure also permits the reflective surface to be extended directly over the hitch which gives a preferred view of whether the male and female parts of the hitch are properly positioned.

Numerous other advantages and features of the present invention will become readily apparent from the following detailed description of the preferred embodiments and the appended claims.

BRIEF DESCRIPTION OF THE DRAWINGS

FIG. 1 is a perspective view of a hitching mirror of the present invention affixed to a rear window of a towing vehicle;

FIG. 2 is a perspective view of the hitching mirror having two panels adjustably connected;

FIG. 3 is a side cross-sectional view of the hitching mirror taken through line 3—3 of FIG. 2;

DETAILED DESCRIPTION OF THE PREFERRED EMBODIMENTS

Figure 4:
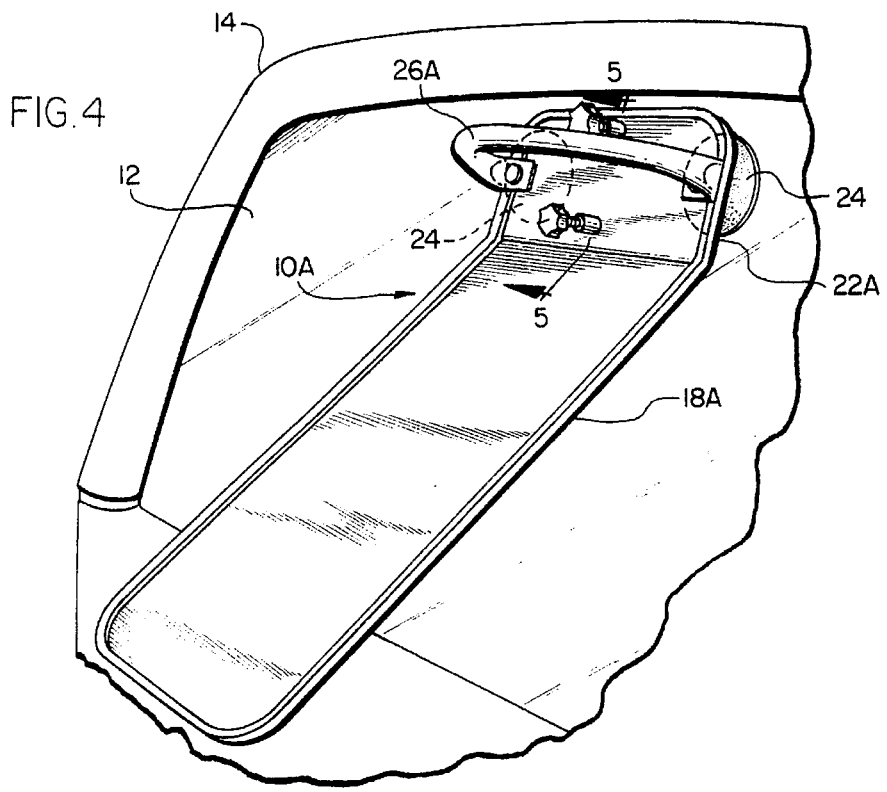
FIG. 4 is a perspective view of an alternative of the hitching mirror having two panels that are in a fixed relationship.

Although this invention is susceptible to embodiment in many different forms, there are illustrated in the figures and described in detail herein, presently preferred embodiments of the invention. It should be understood, however, that the present disclosure is to be considered as an exemplification of the principles of this invention and is not intended to limit the invention to the embodiments described.

A hitching mirror of the present invention will be discussed herein in connection with a hitch that has a male ball on a towing vehicle and a female socket on a towing vehicle, it being understood that the present hitching mirror can be used with other types of hitches.

FIG. 1 of the drawing illustrates a representative environment wherein a hitching mirror 10 of the present invention is removably affixed to a rear window 12 of a towing vehicle 14 with the mirror 10 extending over a ball 16 of the hitch. The female socket for mating with the male ball 16 is on a towed vehicle that is not illustrated in the drawing.

As shown in FIG. 1, the towing vehicle 14 has a rear window 12 from which the hitching mirror is attached to said vehicle reflecting the image of the hitch 16. Representative towing vehicles include sports utility vehicles, pickup trucks having caps over the truck bed, station wagons, mobile homes, automobiles and the like. The towed vehicle is any vehicle that is suitable to be towed. Furthermore, the hitching mirror disclosed herein may be used on the front window of a van-like vehicle having its front window extending upwardly from the front end of said vehicle where the hitching mechanism is attached to the front end of the vehicle.

Referring to FIGS. 2 and 3, the hitching mirror 10 has a first panel 18 having a lower reflective surface 20. The hitching mirror 10 also includes a connected second panel 22 having at least one suction cup 24 for reversibly attaching the second panel 22 and hence the first panel 18, to the rear window 12. Handle 26 extends from a side of the second panel 22 opposite the side from which the suction cup 24 extends and is positioned relative to the suction cup 24 to facilitate applying pressure to the suction cup 24 to secure the hitching mirror 10 to the rear window 12. The handle 26 also provides a convenient location to hold the hitching mirror 10 when removing the hitching mirror 10 from the rear window 12. Feet 28 extending from the same side of the second panel 22 as the suction cup 24 and help stabilize the hitching mirror 10 on the rear window 12.

The second panel 22 is discrete from the first panel 18. Elongate hinge 30 extends between adjacent edges 32, 34 of the first and second panels 18, 22, respectively, to flexibly join the first and second panels 18, 22 and permit relative motion therebetween. A stiff incremental adjuster 36 is operably associated with the first and second panels 18, 22 to permit incrementally adjustment of the position of the reflective surface 20 relative to the second panel 22, and hence relative to the hitch, with fine control over the adjustment. Any known pivot means, such as eye rings 38, 40 on the first and second panels 18, 22, respectively, permit the incremental adjuster 36 to pivot during adjustment. The incremental adjuster 36 is preferably a turnbuckle 37 having a threaded rod 42 extending from the eye ring 38, a rotatable threaded member 44 that receives a threaded end of the threaded rod 42 and that is also rotatably associated with a swivel rod 46 that is received in the eye ring 40. Additionally, at least one memory markers, such as internally threaded o-ring 45, may be appropriately positioned on a threaded portion of the threaded rod 42 to mark a preferred position of the turnbuckle 37 relative to the threaded rod 42 and thus arrange the first panel in a preferred position. Similarly, in the embodiment shown in FIGS. 4–6, a memory marker 59 (as shown in FIG.) may be appropriately positioned on a threaded portion of each of the threaded shafts 58.

An optional position indicator 48 may be employed in connection with the turnbuckle 37 to indicate the relative positions of the first and second panels 18, 22. As shown in FIG. 2, the indicator 48 is placed on an upper surface 50 of the first panel 18. Lines 52 on the indicator 48 permit a user to align the turnbuckle 44 with one of the lines 52 so that the reflective surface 20 can be positioned in approximately the correct position prior to the driver attempting to view the hitch through the rear view mirror prior to making incremental adjustments.

Molding 54 extends around the first and second panels 18, 22 to give a finished appearance. Alternatively, the outer edges of a panel may be folded downwardly, upwardly, or rolled to provide a finished appearance and to further strengthen the panel and minimize distortion. By extending the edges of the first panel downwardly (or rolled or by employing molding) relative to the reflective surface thereof, the finish of the reflective surface may be protected from scratches when the hitching mirror is removed from the window and set down on a hard surface.

As can best be seen in FIG. 3, screwing the threaded rod 42 into and out of the turnbuckle 44 results in the first panel 18 moving in the direction indicated by the arrows A and B, respectively.

Figures 5, 6:
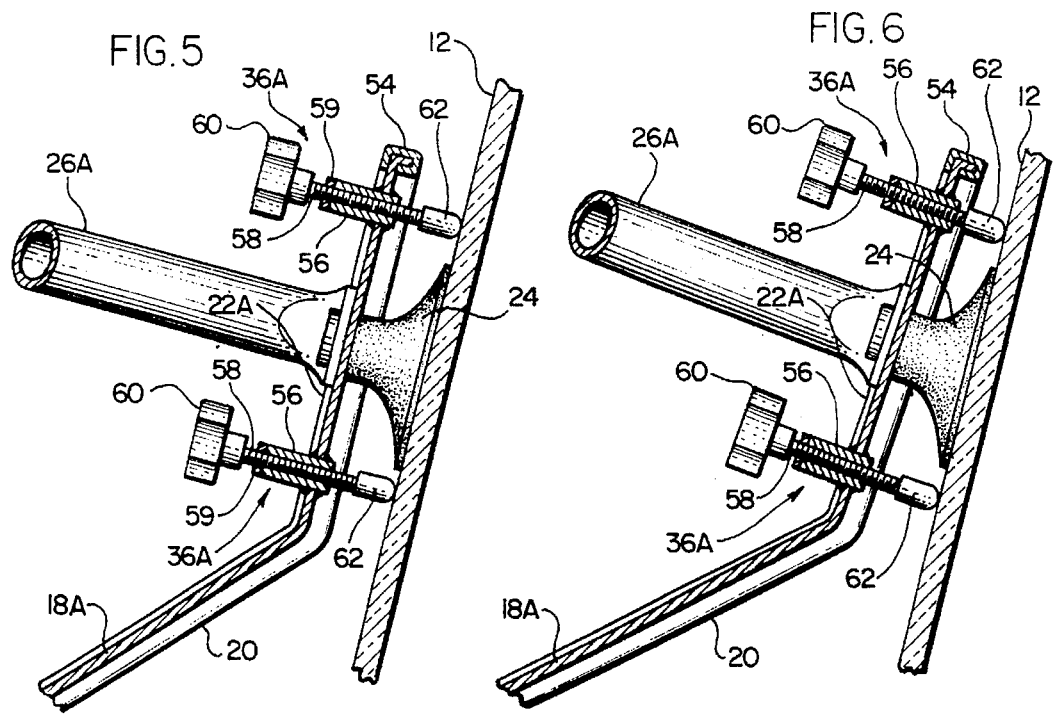
FIG. 5 is a partial cross-sectional view of the alternative hitching mirror taken through line 5—5 of FIG. 4.
FIG. 6 is a partial cross-sectional view of the alternative hitching mirror having two panels in a fixed relationship adjusted at a different angle than the hitching mirror illustrated in FIG. 5.

FIGS. 4, 5 and 6 illustrate another preferred embodiment of the hitching mirror 10A of the instant invention, wherein the first panel 18A and the second panel 22A are in a fixed relationship with each other. In this embodiment of the hitching mirror 10A, the first and second panels 18A, 22A are unitary, i.e., are made from a single piece of material. The hitching mirror 10A is secured to the rear window 12 of the towing vehicle 14 as by a pair of suction cups 24 that extend from a front surface of the second panel 22A. The handle 26A provides the same conveniences and advantages as discussed above in connection with the handle 26.

As can best be seen in FIGS. 5 and 6, an alternative of the incremental adjuster 36A of this preferred embodiment includes at least one threaded housing 56 that extends through the second panel 22A. A threaded shaft 58 is received in and extends through the threaded housing 56. A grip 60 is at one end of the threaded shaft 58. At an opposite end of the threaded shaft 58 is a pad 62 that may be placed in contact with the rear window 12 to cushion the contact with the glass of the rear window 12 extending from the front surface of the second panel 22A. The incremental adjustor 36A permits fine control of the first panel 18A relative to the hitch.

Threading one or more of the threaded shafts 58 into or out of their threaded housings 56 causes the position of the reflective surface 20 to be adjusted relative to the rear window 12 and hence relative to the hitch. A comparison of FIGS. 5 and 6 illustrates how rotating the grip 60 and the threaded shaft 58 of the top incremental adjuster 36A away from the rear window 12, and out of the second panel 22A, and rotating the grip 60 and the threaded rod 58 of the lower incremental adjuster 36A towards the rear window 12 and into the second panel 22A, causes the reflective surface 20 to be adjusted from the position illustrated in FIG. 5 to the position illustrated in FIG. 6. Adjusting is possible due in part to the flexibility of the suction cups 24 that act as pivot points. Obviously, it is possible to adjust the position of the reflective surface 20 using only one of the upper or lower incremental adjusters 36A. However, once the hitching mirror 10 is aligned, it is preferable that both incremental adjusters 36A be in contact with the rear window 12 to provide extra stability.

The panels of the hitching mirror 10 are preferably made of a lightweight impact resistant material such as plastic or metal, e.g. steel or aluminum. The material should also be weather resistant and be capable of being polished to produce the reflective surface. In this manner, the use of glass is avoided and the reflective surface is unbreakable.

The use of an incremental adjuster (36/36A) provides fine control over the position of the reflective surface because the increments are small and do not rely upon gross adjustments. Incremental adjustment permits the user to quickly and accurately position the reflective surface.

The first panel is flat which results in the reflective surface being flat to avoid distortion of the hitch during viewing that occurs with curved mirrors.

The design and configuration of the hitching mirror results in the reflective surface being shielded by the first panel from rain, snow and other precipitation that can impair viewing. Thus, the reflective surface does not become covered with the precipitation.

The first panel is preferably an elongate panel to permit the reflective surface to extend over the hitch. The use of a first panel that extends over the hitch permits the driver to get a true view of the position of the ball and socket to ensure that they are aligned.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

I claim:

1. A hitching mirror for use on a vehicle with a window and a hitch for viewing the hitch on the vehicle, the hitching mirror comprising:

an elongate panel including a reflective surface;

means for securing the elongate panel to the window of the vehicle with the reflective surface disposed toward said window, the securing means comprising a narrow panel affixed to the elongate panel at adjacent ends and at least one means for reversibly attaching the hitching mirror to the window, the reversibly attaching means being arranged on the narrow panel; and a discrete means for incrementally adjusting the position of the reflective surface relative to the securing means, the incremental adjusting means being operably associated with the reflective surface and said narrow panel.

2. The hitching mirror of claim 1 wherein the elongate panel and the securing means are discrete but flexibly joined and the incremental adjusting means comprises a turnbuckle that extends between the elongate panel and the securing means.

3. The hitching mirror of claim 2 wherein the panel and the securing means are unitary, the incremental adjusting means being operably associated with the securing means and the window.

4. A hitching mirror for use on a vehicle with a window and a hitch for viewing the hitch on the vehicle, the hitching mirror comprising:

an elongate panel including a reflective surface;

means for securing the elongate panel to the window of the vehicle with the reflective surface disposed toward said window, the securing means comprising a narrow panel adjustably affixed to the elongate panel at adjacent ends and a suction cup for reversibly attaching the hitching mirror to the window, the suction cup being on the narrow panel; and a turnbuckle for incrementally adjusting the position of the reflective surface relative to the securing means, the turnbuckle extending between the elongate panel and the securing means.

5. A hitching mirror for use on a vehicle with a window and a hitch for viewing the hitch on the vehicle, the hitching mirror comprising:

a panel including a reflective surface;

means for securing the panel to the window of the vehicle with the reflective surface disposed toward said window, wherein the panel and the means for securing are unitary;

a discrete means for incrementally adjusting the position of the reflective surface relative to the means for securing, said means for incremental adjusting is operably associated with the means for securing and the window; and wherein the means for securing comprises a second panel and the means for incremental adjusting comprises at least one shaft extending through the second panel.

6. The hitching mirror of claim 5 wherein the incremental adjusting means comprises at least one memory marker disposed on the shaft extending through the second panel.

* * * * *